US012692796B2

(12) United States Patent
Robinson

(10) Patent No.: US 12,692,796 B2
(45) Date of Patent: Jul. 28, 2026

(54) BRUSH SEAL ASSEMBLY WITH METAL CLIP

(71) Applicant: RTX Corporation, Farmington, CT (US)

(72) Inventor: Garrett M. Robinson, Eliot, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/770,310

(22) Filed: Jul. 11, 2024

(65) Prior Publication Data

US 2026/0015947 A1     Jan. 15, 2026

(51) Int. Cl.
F01D 11/00     (2006.01)
F16B 2/24     (2006.01)

(52) U.S. Cl.
CPC ........ F01D 11/003 (2013.01); F05D 2240/56 (2013.01); F05D 2260/30 (2013.01); F16B 2/245 (2013.01)

(58) Field of Classification Search
CPC .. F16B 2/245; F05D 2260/30; F05D 2240/56; F01D 11/003; F16J 15/3288
See application file for complete search history.

(56) References Cited

U.S. PATENT DOCUMENTS

| | | | | | |
|---|---|---|---|---|---|
| 5,335,920 | A | * | 8/1994 | Tseng | F16J 15/3288 |
| | | | | | 277/303 |
| 5,480,162 | A | * | 1/1996 | Beeman, Jr. | F01D 9/023 |
| | | | | | 277/355 |

| | | | | | |
|---|---|---|---|---|---|
| 6,059,526 | A | | 5/2000 | Mayr | |
| 6,250,640 | B1 | * | 6/2001 | Wolfe | F16J 15/3288 |
| | | | | | 277/303 |
| 6,250,879 | B1 | * | 6/2001 | Lampes | F16J 15/3288 |
| | | | | | 415/231 |
| 6,352,263 | B1 | * | 3/2002 | Gail | F16J 15/3288 |
| | | | | | 277/355 |
| 7,193,836 | B2 | * | 3/2007 | Oh | H02K 11/40 |
| | | | | | 361/220 |
| 9,322,287 | B2 | * | 4/2016 | Zheng | F01D 11/001 |
| 9,759,077 | B2 | | 9/2017 | Beichl | |
| 10,024,192 | B2 | | 7/2018 | Schinko | |

(Continued)

FOREIGN PATENT DOCUMENTS

CN     106194279 A     12/2016

OTHER PUBLICATIONS

EP Search Report for EP Patent Application No. 25188754.3 dated Feb. 2, 2026.

*Primary Examiner* — Eugene G Byrd
(74) *Attorney, Agent, or Firm* — Getz Balich LLC

(57)     ABSTRACT

A rotational equipment assembly includes a brush seal and a clip. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The clip includes a base, an inner leg and an outer leg. The base wraps around the brush seal at the base end. The inner leg projects radially outward from the base to the outer leg. The outer leg projects axially along the axis out from the inner leg towards the tip end.

19 Claims, 9 Drawing Sheets

(56) References Cited

U.S. PATENT DOCUMENTS

| | | | | |
|---|---|---|---|---|
| 10,240,472 B2 | | 3/2019 | Stiehler | |
| 11,028,712 B2 | | 6/2021 | Tyler | |
| 11,421,739 B2 | * | 8/2022 | Hubert | F16C 33/586 |
| 2002/0190474 A1 | * | 12/2002 | Turnquist | F16J 15/3288 |
| | | | | 277/355 |
| 2004/0018085 A1 | * | 1/2004 | Dhar | F16J 15/3288 |
| | | | | 277/355 |
| 2005/0151324 A1 | * | 7/2005 | Plona | F16J 15/3288 |
| | | | | 277/355 |
| 2006/0007609 A1 | * | 1/2006 | Oh | H02K 11/40 |
| | | | | 361/23 |
| 2006/0249911 A1 | * | 11/2006 | Kowalczyk | F16J 15/442 |
| | | | | 277/355 |
| 2007/0063448 A1 | * | 3/2007 | Kowalczyk | F01D 11/00 |
| | | | | 277/355 |
| 2010/0034644 A1 | * | 2/2010 | Scricca | F02C 3/073 |
| | | | | 415/173.1 |
| 2010/0320696 A1 | * | 12/2010 | Gail | F01D 11/00 |
| | | | | 277/355 |
| 2015/0132116 A1 | | 5/2015 | Zheng | |
| 2017/0335705 A1 | * | 11/2017 | Tyler, Jr. | F01D 11/005 |
| 2019/0032786 A1 | * | 1/2019 | Davis | F01D 11/005 |
| 2020/0080646 A1 | * | 3/2020 | Franceschini | F01D 11/127 |
| 2021/0172527 A1 | * | 6/2021 | Paulino | F01D 11/005 |

* cited by examiner

BRUSH SEAL ASSEMBLY WITH METAL CLIP

BACKGROUND OF THE DISCLOSURE

1. Technical Field

This disclosure relates generally to rotational equipment and, more particularly, to a brush seal assembly for the rotational equipment.

2. Background Information

Rotational equipment such as a gas turbine engine may include one or more brush seals. Various types and configurations of brush seals are known in the art. While these known brush seals have various benefits, there is still room in the art for improvement.

SUMMARY OF THE DISCLOSURE

According to an aspect of the present disclosure, an assembly is provided for rotational equipment. This assembly includes a brush seal and a clip. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The clip includes a base, an inner leg and an outer leg. The base wraps around the brush seal at the base end. The inner leg projects radially outward from the base to the outer leg. The outer leg projects axially along the axis out from the inner leg towards the tip end.

According to another aspect of the present disclosure, another assembly is provided for rotational equipment. This assembly includes a brush seal and a sheet metal clip. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The sheet metal clip includes a channel, a radial leg and an axial leg. The brush seal is seated in the channel at the base end. The radial leg projects radially outward away from the brush seal to the axial leg. The axial leg projects out from the radial leg, in an axial direction towards the tip end, to a distal end that is axially recessed from the tip end.

According to still another aspect of the present disclosure, another assembly is provided for rotational equipment. This assembly includes a brush seal and a clip. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The clip comprises sheet metal configured with an inner wall, an outer wall, an endwall, an offset flange and a locator flange. The inner wall projects axially out from an inner end of the endwall along the inner plate to a first edge of the sheet metal. The outer wall projects axially out from an outer end of the endwall along the outer plate. The endwall axially engages the brush seal at the base end. The offset flange projects radially outward from the outer wall to the locator flange. The locator flange projects axially out from the offset flange to a second edge of the sheet metal.

The clip may be configured as or otherwise include a sheet metal clip.

The brush seal may be seated in a channel formed in the base.

The base may include an inner wall, an outer wall and an endwall extending radially between the inner wall and the outer wall. The inner wall may extend axially along and may radially engage the inner plate. The outer wall may extend axially along and may radially engage the outer plate.

The endwall may extend radially along and may axially engage the brush seal at the base end.

The inner wall may project axially along the axis out from the endwall to an axial distal end.

The outer wall may project axially along the axis out from the endwall to the inner leg.

A radial height of the inner leg may be within fifty percent of an axial length of the outer leg.

A radial height of the inner leg may be equal to or less than a radial thickness of the brush seal.

An axial length of the outer leg may be equal to or less than a radial thickness of the brush seal.

The outer leg may project axially along the axis out from the inner leg to a distal end. The distal end may be axially recessed from the tip end.

The outer leg may be parallel with the bristle pack.

The bristle pack may include a plurality of first bristles and a plurality of second bristles arranged radially inboard of the first bristles. The first bristles may have a different configuration than the second bristles.

The brush seal may extend at least three-hundred and forty degrees circumferentially about the axis between opposing circumferential ends of the brush seal with a brush seal gap formed by and extending circumferentially between the opposing circumferential ends of the brush seal. In addition or alternatively, the clip may extend at least three-hundred and forty degrees circumferentially about the axis between opposing circumferential ends of the clip with a clip gap formed by and extending circumferentially between the opposing circumferential ends of the clip.

The clip gap may be circumferentially offset from the brush seal gap.

The assembly may also include a second seal disposed radially outboard of the clip and radially engaging the outer leg.

The second seal may be configured as or otherwise include a ring seal.

The assembly may also include a stationary first engine component and a stationary second engine component. The clip may axially and radially engage the stationary first engine component. The bristle pack may axially engage the stationary second engine component at the tip end.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
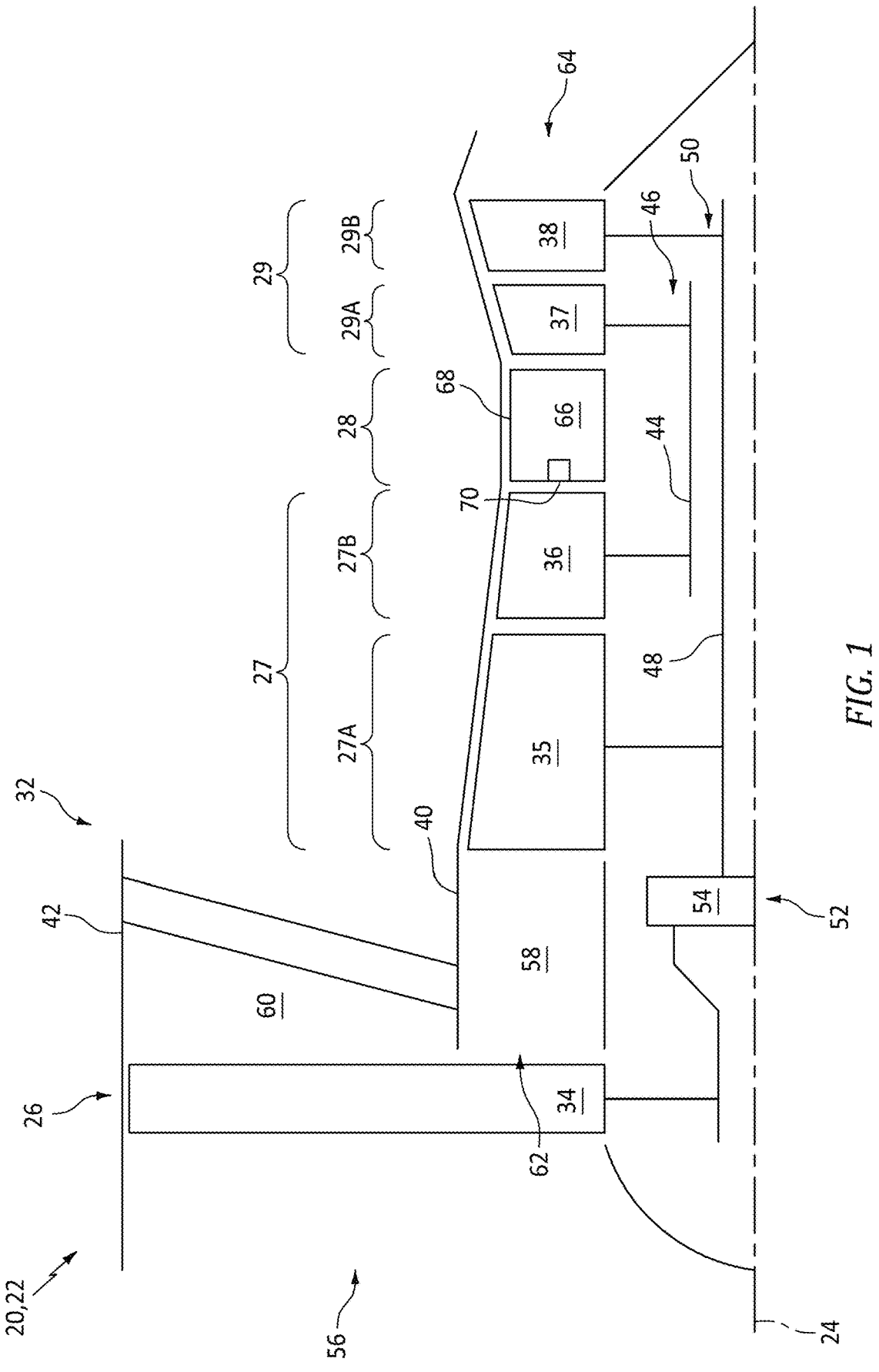
FIG. 1 is a partial schematic illustration of an aircraft powerplant.

FIG. 1 illustrates a powerplant 20 of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such an exemplary aircraft propulsion system. The aircraft propulsion system, for example, may alternatively be configured as a turbojet propulsion system, a turboprop propulsion system, a turboshaft propulsion system or an open rotor propulsion system. Moreover, the present disclosure is not limited to propulsion system applications. The turbine engine 22, for example, may alternatively be configured as or included as part of an auxiliary power unit (APU) for the aircraft or a ground-based (e.g., industrial) electrical power system.

The turbine engine 22 of FIG. 1 extends axially along an axis 24 between a forward, upstream end of the turbine engine 22 and an aft, downstream end of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 26 (e.g., a fan section), a compressor section 27, a combustor section 28 and a turbine section 29. The compressor section 27 includes a low pressure compressor (LPC) section 27A and a high pressure compressor (HPC) section 27B. The turbine section 29 includes a high pressure turbine (HPT) section 29A and a low pressure turbine (LPT) section 29B.

The engine sections 26-29B may be arranged sequentially along the axis 24 within a stationary engine housing 32. The propulsor section 26 includes a bladed propulsor rotor 34; e.g., a fan rotor. The LPC section 27A includes a bladed low pressure compressor (LPC) rotor 35. The HPC section 27B includes a bladed high pressure compressor (HPC) rotor 36. The HPT section 29A includes a bladed high pressure turbine (HPT) rotor 37. The LPT section 29B includes a bladed low pressure turbine (LPT) rotor 38. These engine rotors 34-38 are housed within the engine housing 32. The engine housing 32 of FIG. 1, for example, includes an inner housing structure 40 (e.g., a core case structure) and an outer housing structure 42 (e.g., a propulsor case structure). The inner housing structure 40 may house one or more of the engine sections 27A-29B and their engine rotors 35-38. The outer housing structure 42 may house at least the propulsor section 26 and its propulsor rotor 34.

The HPC rotor 36 is coupled to and rotatable with the HPT rotor 37. The HPC rotor 36 of FIG. 1, for example, is connected to the HPT rotor 37 through a high speed shaft 44. At least (or only) the HPC rotor 36, the HPT rotor 37 and the high speed shaft 44 collectively form a high speed rotating assembly 46; e.g., a high speed spool of a core of the turbine engine 22. This high speed rotating assembly 46 of FIG. 1 and its members are rotatable about the axis 24.

The LPC rotor 35 is coupled to and rotatable with the LPT rotor 38. The LPC rotor 35 of FIG. 1, for example, is connected to the LPT rotor 38 through a low speed shaft 48. At least (or only) the LPC rotor 35, the LPT rotor 38 and the low speed shaft 48 collectively form a low speed rotating assembly 50; e.g., a low speed spool of the engine core. This low speed rotating assembly 50 is further coupled to the propulsor rotor 34 through a drivetrain 52. This drivetrain 52 may be configured as a geared drivetrain, where a geartrain 54 (e.g., a transmission, a speed change device, an epicyclic geartrain, etc.) is disposed between and operatively couples the propulsor rotor 34 to the low speed rotating assembly 50 and its LPT rotor 38. With this arrangement, the propulsor rotor 34 may rotate at a different (e.g., slower) rotational velocity than the low speed rotating assembly 50 and its LPT rotor 38. However, the drivetrain 52 may alternatively be configured as a direct drive drivetrain, where the geartrain 54 is omitted. With such an arrangement, the propulsor rotor 34 rotates at a common (the same) rotational velocity as the low speed rotating assembly 50 and its LPT rotor 38. The low speed rotating assembly 50 of FIG. 1 and its members as well as the propulsor rotor 34 are rotatable about the axis 24.

During operation, ambient air from outside of the aircraft enters the aircraft powerplant 20 and its turbine engine 22 through an airflow inlet 56. This air is directed across the propulsor section 26 and into a (e.g., annular) core flowpath 58 and a (e.g., annular) bypass flowpath 60. The core flowpath 58 of FIG. 1 extends sequentially through the LPC section 27A, the HPC section 27B, the combustor section 28, the HPT section 29A and the LPT section 29B from an airflow inlet 62 into the core flowpath 58 to a combustion products exhaust 64 out from the core flowpath 58 and the engine core. The air entering the core flowpath 58 may be referred to as "core air". The bypass flowpath 60 extends through a bypass duct, which bypasses (e.g., is disposed radially outboard of and extends along) the engine core. The air within the bypass flowpath 60 may be referred to as "bypass air".

The core air is compressed by the LPC rotor 35 and the HPC rotor 36 and is directed into a (e.g., annular) combustion chamber 66 of a (e.g., annular) combustor 68 in the combustor section 28. Fuel is injected into the combustion chamber 66 by one or more fuel injectors 70 and mixed with the compressed core air to provide a fuel-air mixture. This fuel-air mixture is ignited and combustion products thereof flow through and sequentially drive rotation of the HPT rotor 37 and the LPT rotor 38 about the axis 24. The rotation of the HPT rotor 37 and the LPT rotor 38 respectively drive rotation of the HPC rotor 36 and the LPC rotor 35 about the axis 24 and, thus, compression of the air received from the core inlet 62. The rotation of the LPT rotor 38 also drives rotation of the propulsor rotor 34. The rotation of the propulsor rotor 34 propels the bypass air through and out of the bypass flowpath 60. The propulsion of the bypass air may account for a majority of thrust generated by the turbine engine 22 of FIG. 1, e.g., more than seventy-five percent (75%) of engine thrust. The turbine engine 22 of the present disclosure, however, is not limited to the foregoing exemplary thrust ratio.

Figure 2:
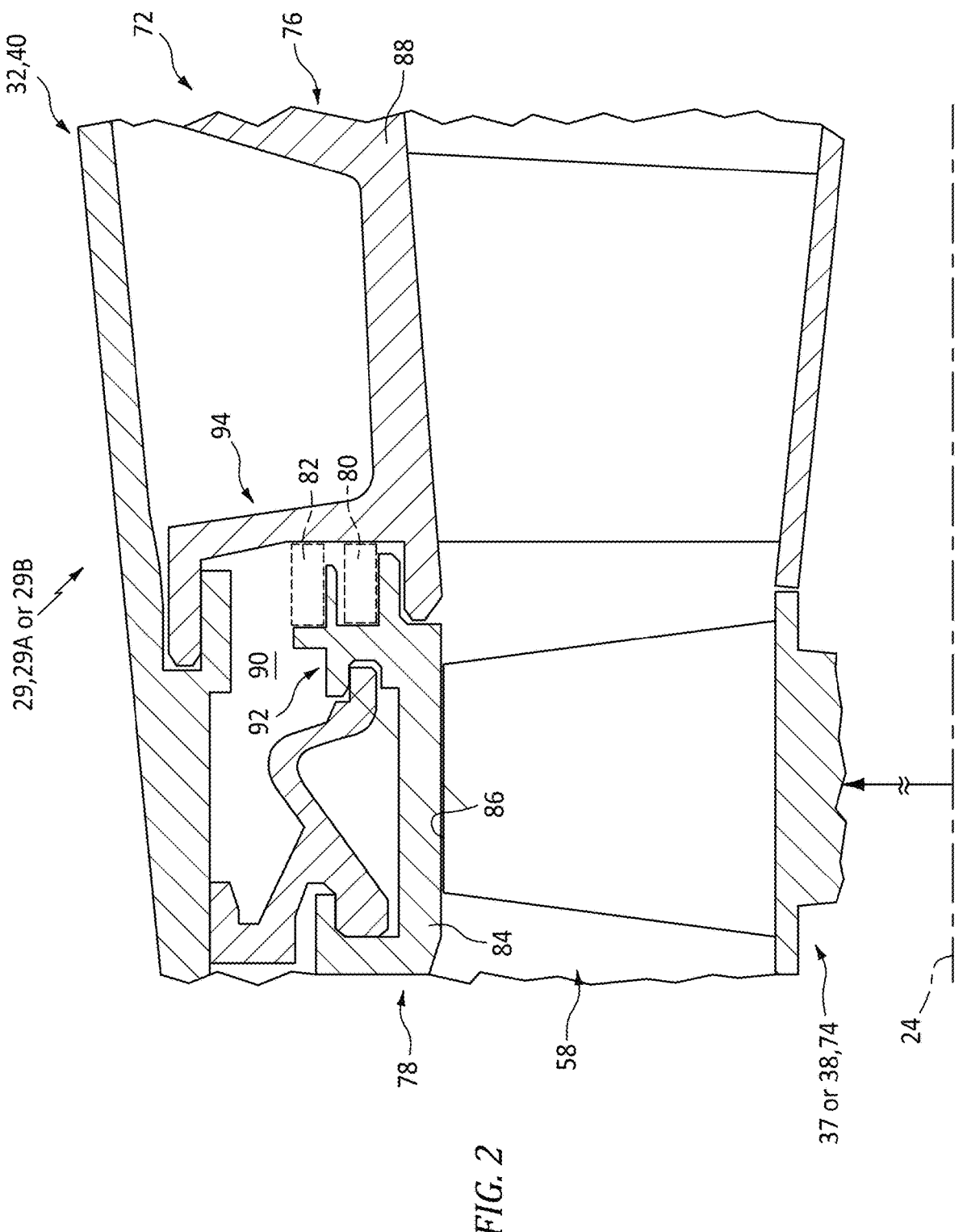
FIG. 2 is a sectional illustration of a portion of the aircraft powerplant along a core flowpath.

FIG. 2 illustrates a stationary engine structure 72 arranged with an engine rotor 74, where the engine structure 72 and the engine rotor 74 are housed within the inner housing structure 40. For ease of description, the engine structure 72 and the engine rotor 74 are described below as being located along the core flowpath 58 within the turbine section 29. The engine structure 72, for example, may extend along the core flowpath 58 within the HPT section 29A, and the engine rotor 74 may be the HPT rotor 37. In another example, the engine structure 72 may extend along the core flowpath 58 within the LPT section 29B, and the engine rotor 74 may be the LPT rotor 38. The present disclosure, however, is not limited to such exemplary arrangements within the turbine section 29. Moreover, it is contemplated the engine structure 72 may alternatively extend along the core flowpath 58 within the compressor section 27 (see FIG. 1), and the engine rotor 74 may alternatively be one of the compressor rotors 35, 36 (see FIG. 1).

The engine structure 72 of FIG. 2 includes a turbine vane structure 76, a blade outer air seal 78 ("BOAS"; sometimes also referred to as an "outer shroud"), a brush seal assembly 80 and a ring seal 82. The vane structure 76 of FIG. 2 is disposed next to and may be downstream of the engine rotor 74 along the core flowpath 58. A tubular flowpath wall 84 of the blade outer air seal 78 is disposed next to and radially outboard of rotor blade tips 86 of the engine rotor 74. The blade outer air seal 78 and its flowpath wall 84 axially overlap and circumscribe the engine rotor 74 and its rotor blade tips 86. The blade outer air seal 78 and its flowpath wall 84 are disposed next to and may be upstream of a tubular outer platform 88 of the vane structure 76 along the core flowpath 58. With this arrangement, the flowpath wall 84 and the outer platform 88 form a radial outer peripheral boundary of a longitudinal section of the core flowpath 58. The flowpath wall 84 and the outer platform 88 also provide a barrier between the core flowpath 58 and a cooling air volume 90 (e.g., passage, plenum, etc.) radially outboard of the core flowpath 58. The brush seal assembly 80 and the ring seal 82 are configured axially between the blade outer air seal 78 and the vane structure 76 to reduce or prevent fluid leakage (e.g., cooling air leakage) radially across the engine structure 72 from the cooling air volume 90 into the core flowpath 58. The brush seal assembly 80 and the ring seal 82 of FIG. 2, for example, each engage (e.g., contact), extend axially between and seal an axial gap between a (e.g., downstream) mounting structure 92 of the blade outer air seal 78 and a (e.g., upstream) mounting structure 94 of the vane structure 76. In the arrangement of FIG. 2, the brush seal assembly 80 is located radially outboard of the flowpath wall 84 and the outer platform 88. The ring seal 82 is located next to and radially outboard the brush seal assembly 80.

Figure 3:
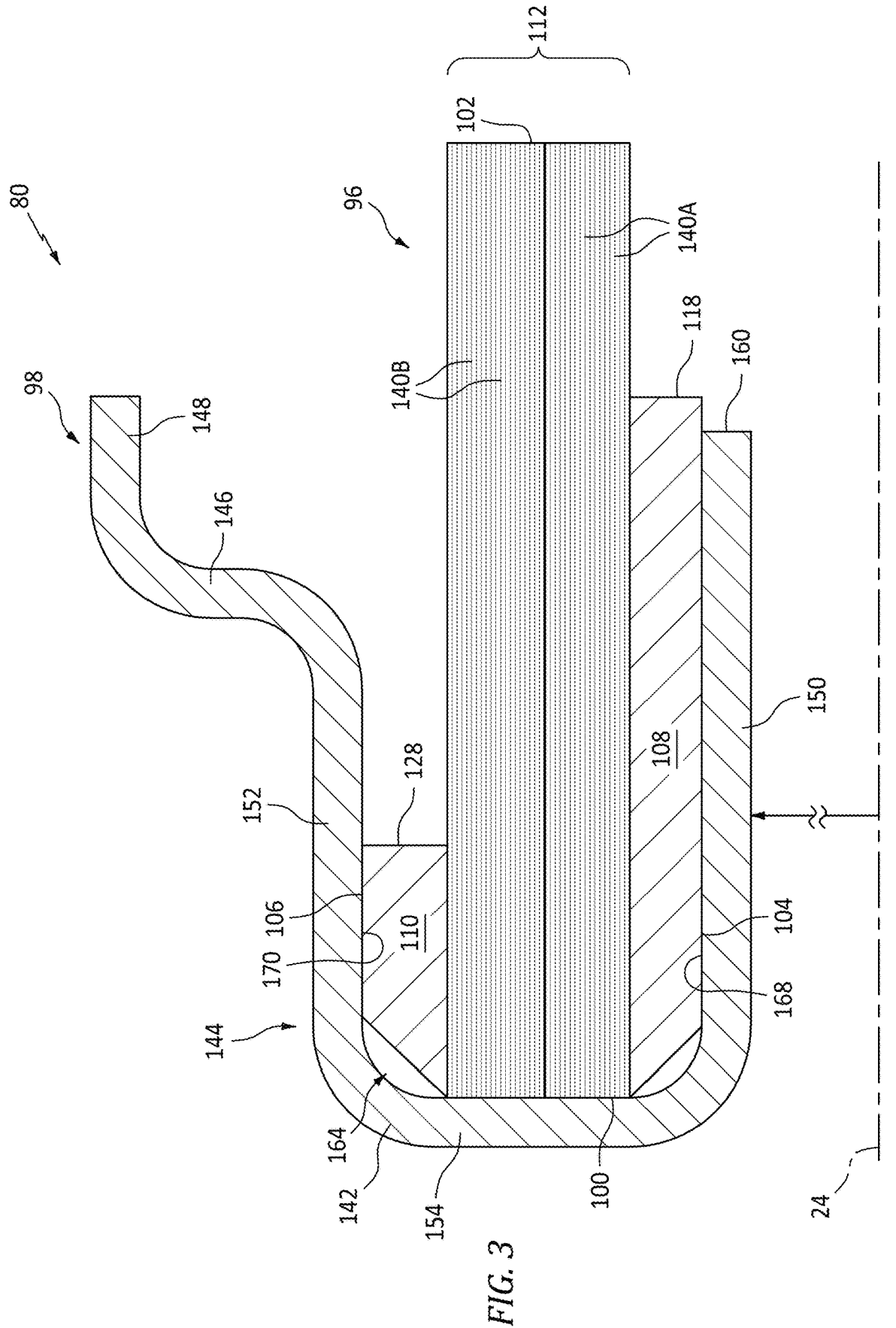
FIG. 3 is a partial sectional illustration of a brush seal assembly.

Referring to FIG. 3, the brush seal assembly 80 includes a brush seal 96 and a brush seal clip 98. Briefly, the brush seal clip 98 may be configured as a windage cover for the brush seal 96. The brush seal clip 98 may also be configured as a protective cover to protect the brush seal 96 from damage resulting from high velocity cooling air or other damage.

Figure 4:
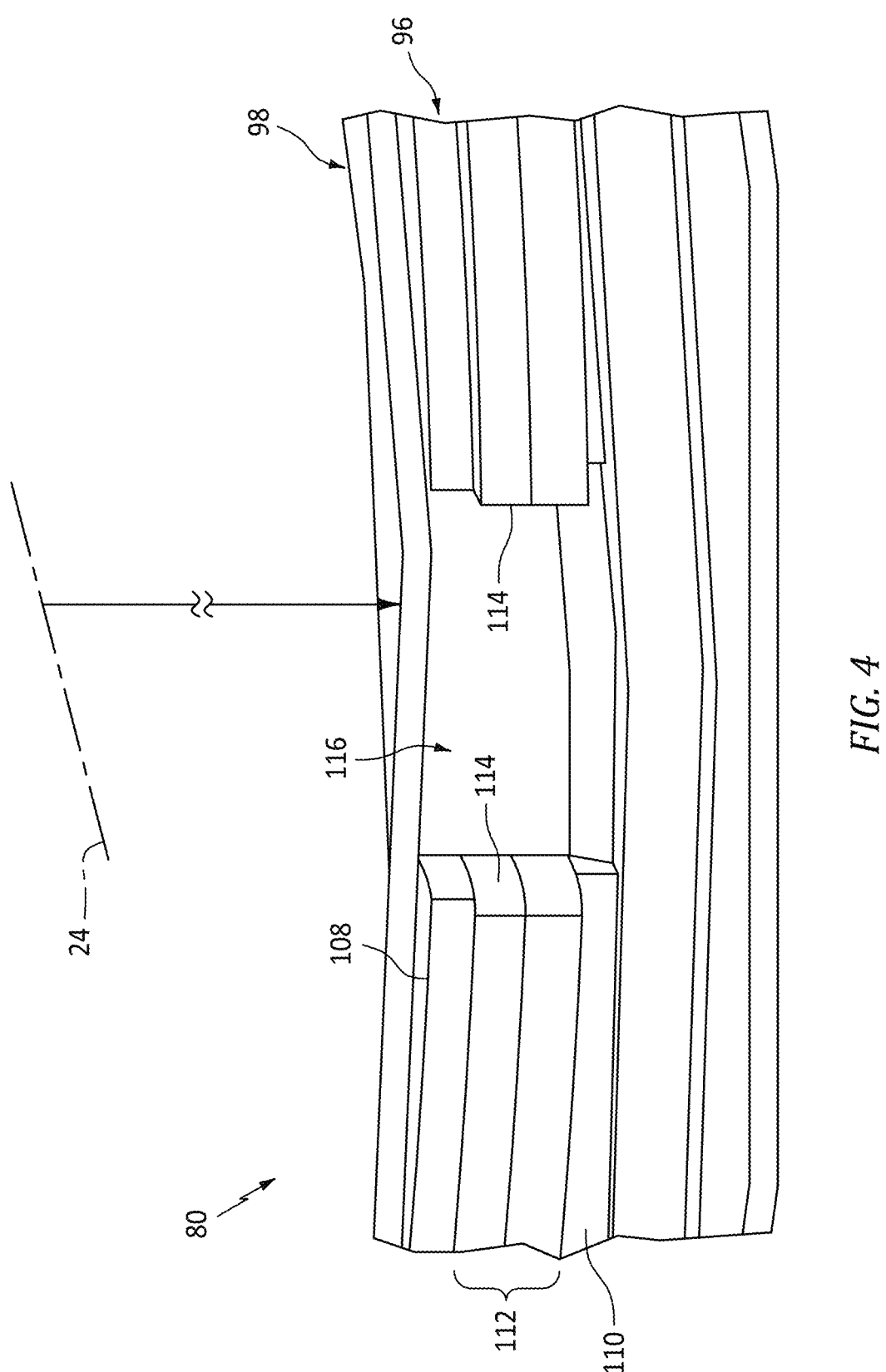
FIG. 4 is a partial perspective illustration of the brush seal assembly at a brush seal gap.

The brush seal 96 extends axially along the axis 24 from a base end 100 of the brush seal 96 to a tip end 102 of the brush seal 96. The brush seal 96 extends radially from a radial inner side 104 of the brush seal 96 to a radial outer side 106 of the brush seal 96. The brush seal 96 of FIG. 3 includes a radial inner plate 108 (e.g., a back plate), a radial outer plate 110 (e.g., a front plate) and a bristle pack 112. The brush seal 96 and each of its members 108, 110 and 112 extend circumferentially about the axis 24, providing the brush seal 96 and each of its members 108, 110 and 112 with a substantially full-hoop (e.g., annular) geometry. The brush seal 96 and each of its members 108, 110 and 112, for example, may extend continuously, uninterrupted at least three-hundred and forty degrees (340°) or three-hundred and fifty degrees (350°) about the axis 24 between circumferentially opposing ends 114 of the brush seal 96 (see FIG. 4). Referring to FIG. 4, the seal ends 114 are circumferentially spaced apart by a brush seal gap 116. This seal gap 116 extends radially and axially through the brush seal 96 thereby providing the brush seal 96 with a circumferentially split ring geometry; e.g., a piston ring-type geometry.

Figure 5:
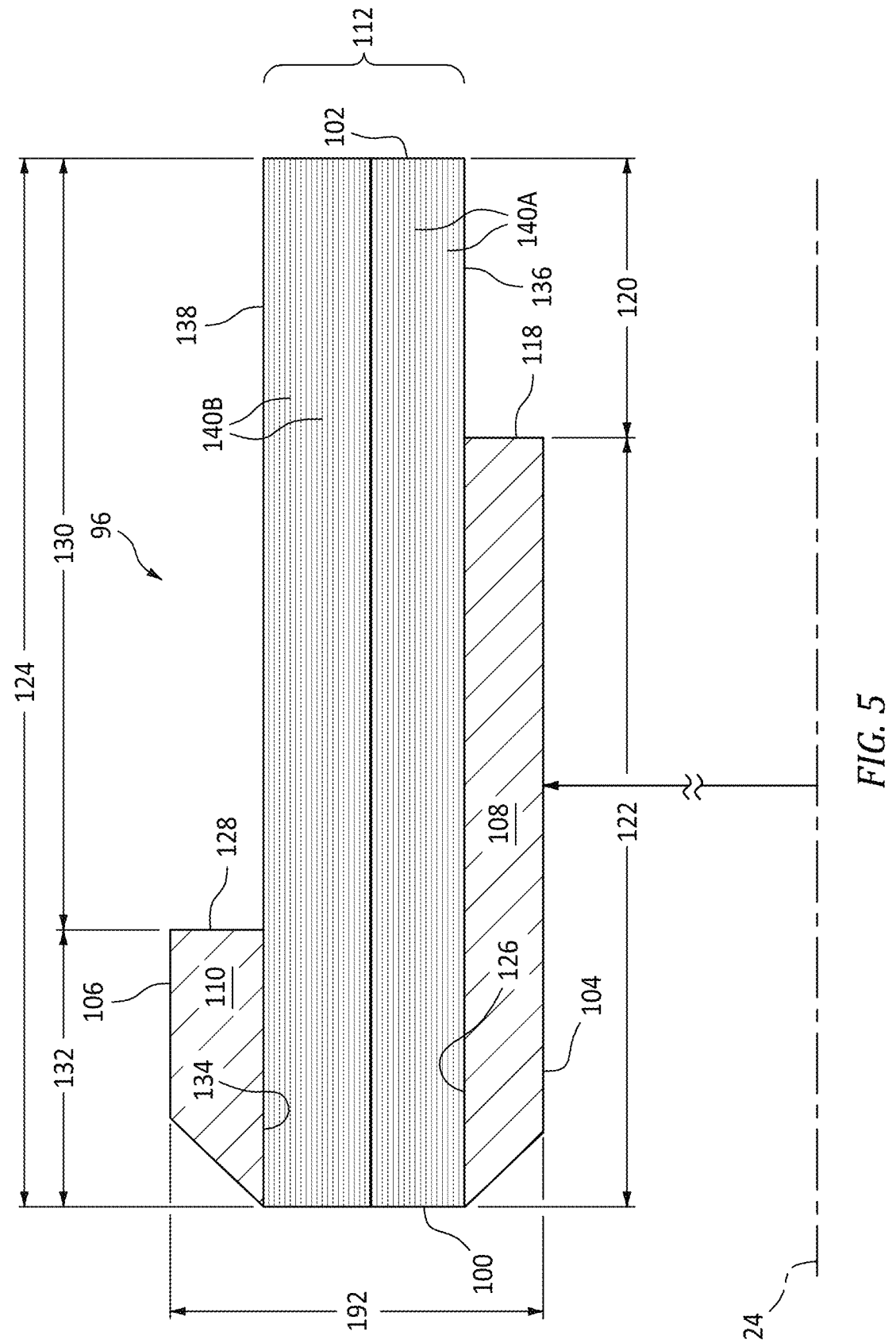
FIG. 5 is a partial sectional illustration of a brush seal.

Referring to FIG. 5, the inner plate 108 extends axially along the axis 24 in an axial first direction (e.g., away from the seal base end 100/towards the seal tip end 102) from (or about) the seal base end 100 to a distal end 118 of the inner plate 108. This inner plate distal end 118 is axially recessed from the seal tip end 102 by a non-zero axial distance 120. The inner plate 108 thereby has an axial length 122 which is less than an axial length 124 of the brush seal 96. The inner plate 108 is disposed at (e.g., on, adjacent or proximate) the seal inner side 104. The inner plate 108 of FIG. 5, for example, extends radially between and to the seal inner side 104 and a radial outer side 126 of the inner plate 108. The inner plate 108 of FIG. 5 is constructed from metal.

The outer plate 110 extends axially along the axis 24 in the first direction from (or about) the seal base end 100 to a distal end 128 of the outer plate 110. This outer plate distal end 128 is axially recessed from the seal tip end 102 by a non-zero axial distance 130 which may be greater than the axial distance 120. The outer plate 110 thereby has an axial length 132 which is less than the axial length 124 of the brush seal 96. The outer plate axial length 132 may also be less than the inner plate axial length 122. The outer plate 110 is disposed at the seal outer side 106. The outer plate 110 of FIG. 5, for example, extends radially between and to the seal outer side 106 and a radial inner side 134 of the outer plate 110. The outer plate 110 of FIG. 5 is constructed from metal.

The bristle pack 112 extends axially along the axis 24 in the first direction from (or about) the seal base end 100 to the seal tip end 102. The bristle pack 112 may thereby have an axial length which is equal to (or slightly less than) the axial length 124 of the brush seal 96. The bristle pack 112 is disposed radially between the inner plate 108 and the outer plate 110. The bristle pack 112 of FIG. 5, for example, extends radially between and to a radial inner side 136 of the bristle pack 112 and a radial outer side 138 of the bristle pack 112. The bristle pack inner side 136 may be engaged with (e.g., radially abutted against) the inner plate outer side 126. The bristle pack outer side 138 may be engaged with (e.g., radially abutted against) the outer plate inner side 134.

The bristle pack 112 is formed from a dense array of brush seal bristles 140A and 140B (generally referred to as "140"). Each of these bristles 140 may extend longitudinally generally in the first direction from (or about) the seal base end 100 to the seal tip end 102. Note, a trajectory of a longitudinal extent of each bristle 140 may only include an axial component. Alternatively, the trajectory of the longitudinal extent of one, some or all of the bristles 140 may also include a circumferential component, for example, to reduce likelihood of bristle buckling.

Figure 6:
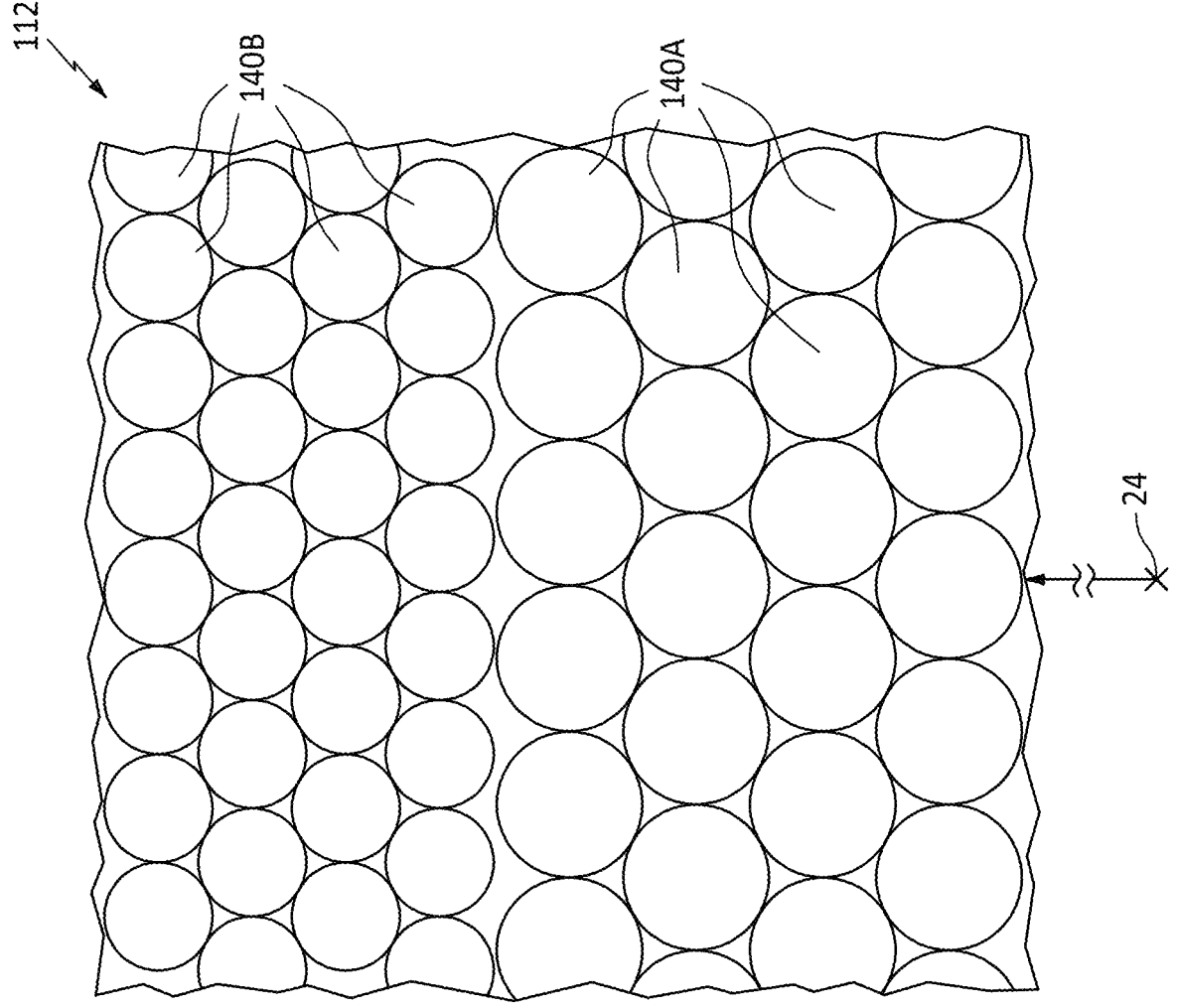
FIG. 6 is an end view illustration of a portion of a bristle pack.

The bristles 140 may be arranged into an inner set of bristles 140A and an outer set of bristles 140B, where the inner set of bristles 140A are located radially inboard of the outer set of bristles 140B. Referring to FIG. 6, the inner set of the bristles may be configured with a different configuration than the outer set of bristles 140B. A diameter of each bristle 140A in the inner set of bristles 140A of FIG. 6, for example, is larger than a diameter of each bristle 140B in the outer set of bristles 140B. The present disclosure, however, is not limited to such an exemplary bristle pack arrangement. Moreover, in other embodiments, all of the bristles included in the bristle pack 112 may have a common (the same) configuration. Each of the bristles 140 of FIG. 6 is constructed from metal; e.g., each bristle 140 may be a metal wire or a metal filament.

Referring to FIG. 5, the bristle pack 112 is bonded to the inner plate 108 and the outer plate 110. The bristle pack 112 and each of its bristles 140, for example, may be welded to the inner plate 108 and the outer plate 110 at the seal base end 100. With this arrangement, the bristle pack 112 and its bristles 140 are fixed to the inner plate 108 and the outer plate 110 at the seal base end 100. However, the bristle pack 112 and its bristles 140 are loose (e.g., unrestricted) at the seal tip end 102.

Figure 7:
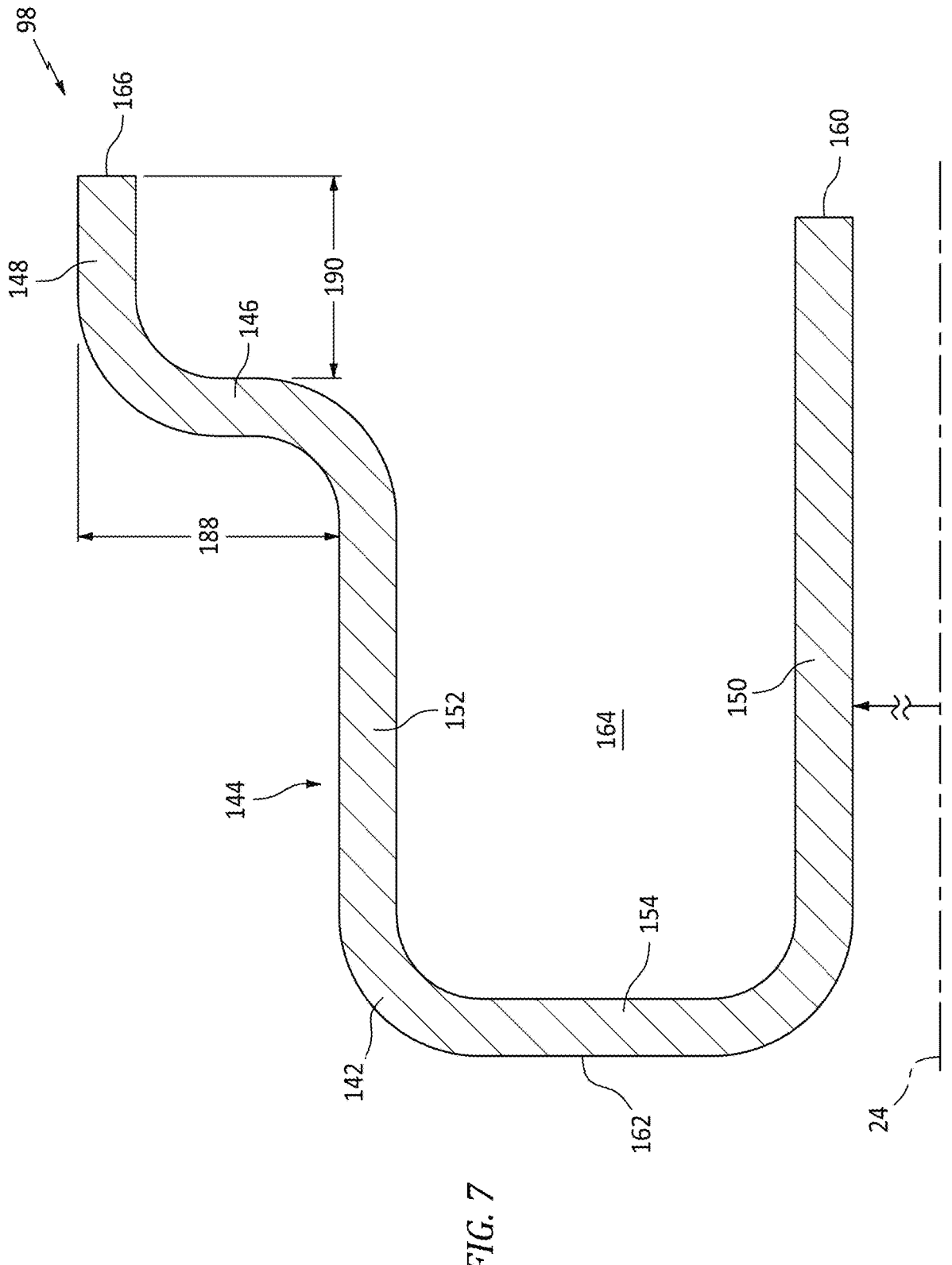
FIG. 7 is a partial sectional illustration of a brush seal clip.
Figure 8:
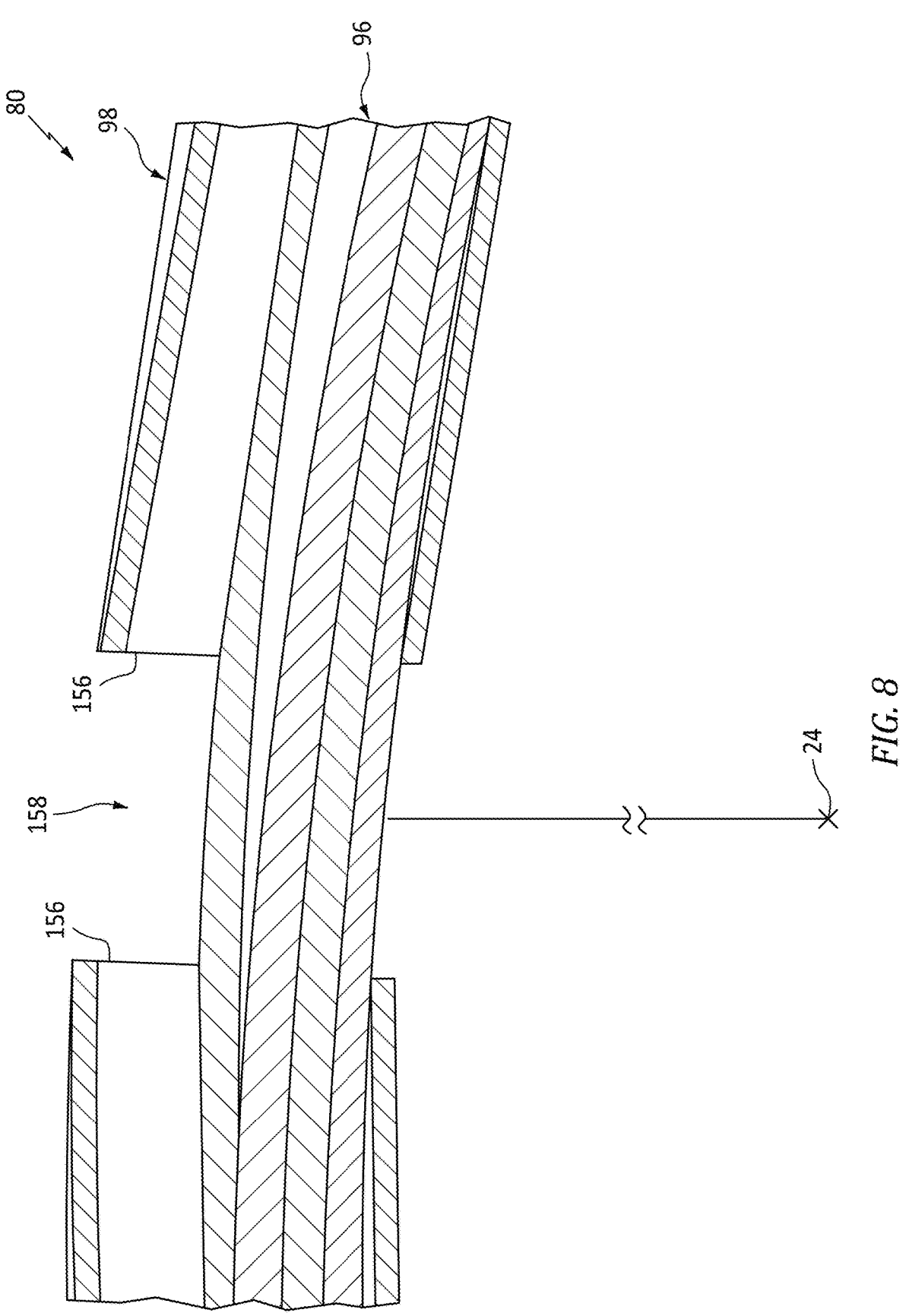
FIG. 8 is a partial perspective illustration of the brush seal assembly at a brush seal clip gap.

Referring to FIG. 7, the seal clip 98 may be formed from a piece of sheet metal 142. This sheet metal 142 may be configured (e.g., cut, shaped, etc.) to provide the seal clip 98 with a channeled clip base 144, an offset flange 146 and a locator flange 148. The clip base 144 includes an inner wall 150, an outer wall 152 and an endwall 154. The seal clip 98 and each of its members 144, 146, 148, 150, 152 and 154 extend circumferentially about the axis 24, providing the seal clip 98 and each of its members 144, 146, 148, 150, 152 and 154 with a substantially full-hoop (e.g., annular) geometry. The seal clip 98 and each of its members 144, 146, 148, 150, 152 and 154, for example, may extend continuously, uninterrupted at least three-hundred and forty degrees (340°) or three-hundred and fifty degrees (350°) about the axis 24 between circumferentially opposing ends 156 of the seal clip 98 (see FIG. 8). Referring to FIG. 8, the clip ends 156 are circumferentially spaced apart by a seal clip gap 158. This clip gap 158 extends radially and axially through the seal clip 98 thereby providing the seal clip 98 with a circumferentially split ring geometry; e.g., a piston ring-type geometry.

Referring to FIG. 7, the inner wall 150 projects axially along the axis 24 in the first direction out from a radial inner end of the endwall 154 to an axial distal end 160 of the inner wall 150. This inner wall distal end 160 may be formed by a first edge of the sheet metal 142. The inner wall 150 of FIG. 7 may be substantially (e.g., within two degrees, or five degrees) or completely parallel with the axis 24 and/or the bristle pack 112 when viewed, for example, in a reference plane parallel to (e.g., including) the axis 24.

The outer wall 152 projects axially along the axis 24 in the first direction out from a radial outer end of the endwall 154 to a radial inner end of the offset flange 146. The outer wall 152 of FIG. 7 may be substantially or completely parallel with the axis 24, the bristle pack 112 and/or the inner wall 150 when viewed, for example, in the reference plane.

The endwall 154 projects radially out from an axial end of the inner wall 150 to an axial end of the outer wall 152. The endwall 154 of FIG. 7 may be substantially or completely perpendicular to the axis 24, the inner wall 150 and/or the outer wall 152 when viewed, for example, in the reference plane. Here, the endwall 154 forms an axial base end 162 of the seal clip 98.

The inner wall 150, the outer wall 152 and the endwall 154 form an internal channel 164 in the clip base 144. This clip channel 164 projects axially along the axis 24 in an axial second direction (e.g., away from the seal tip end 102/ towards the seal base end 100 of FIG. 3; opposite the first direction) into the clip base 144 to the endwall 154. The clip channel 164 extends radially within the clip base 144 between and to the inner wall 150 and the outer wall 152. The clip channel 164 extends circumferentially about the axis 24 through the seal clip 98 and its clip base 144.

The offset flange 146 may be configured as a radial, inner leg of material; e.g., compared to the locator flange 148. The offset flange 146 of FIG. 7, for example, projects radially outward (e.g., away from the axis 24) from an axial end of the outer wall 152 to an axial end of the locator flange 148.

The locator flange 148 may be configured as an axial, outer leg of material; e.g., compared to the offset flange 146. The locator flange 148 of FIG. 7, for example, projects axially along the axis 24 in the first direction out from a radial outer end of the offset flange 146 to an axial distal end 166 of the locator flange 148. This locator flange distal end 166 may be formed by a second edge of the sheet metal 142. The locator flange 148 of FIG. 7 may be substantially or completely parallel with the axis 24, the bristle pack 112, the inner wall 150 and/or the outer wall 152 when viewed, for example, in the reference plane.

Referring to FIG. 3, the brush seal 96 is mated with the seal clip 98. The brush seal 96, for example, projects axially along the axis 24 in the second direction into the clip channel 164. Within the clip channel 164, the brush seal 96 may axially engage the endwall 154 at the seal base end 100. The brush seal 96 and its inner plate 108 may radially engage the inner wall 150. The seal inner side 104 of FIG. 3, for example, may lay against a radial outer side 168 of the inner wall 150. The inner wall distal end 160 may be (e.g., slightly) axially recess from the inner plate distal end 118. The brush seal 96 and its outer plate 110 may radially engage the outer wall 152. The seal outer side 106 of FIG. 3, for example, may lay against a radial inner side 170 of an axial section of the outer wall 152 proximate the seal base end 100. Another axial section of the outer wall 152, however, may be radially spaced from the brush seal 96 at the bristle pack outer side 138 by a radial gap; e.g., an air gap. With this arrangement, the brush seal 96 is seated within the clip channel 164 at the seal base end 100. The clip base 144 also wraps partially around the brush seal 96 and its members 108, 110 and 112 at the seal base end 100 when viewed, for example, in the reference plane.

Figure 9:
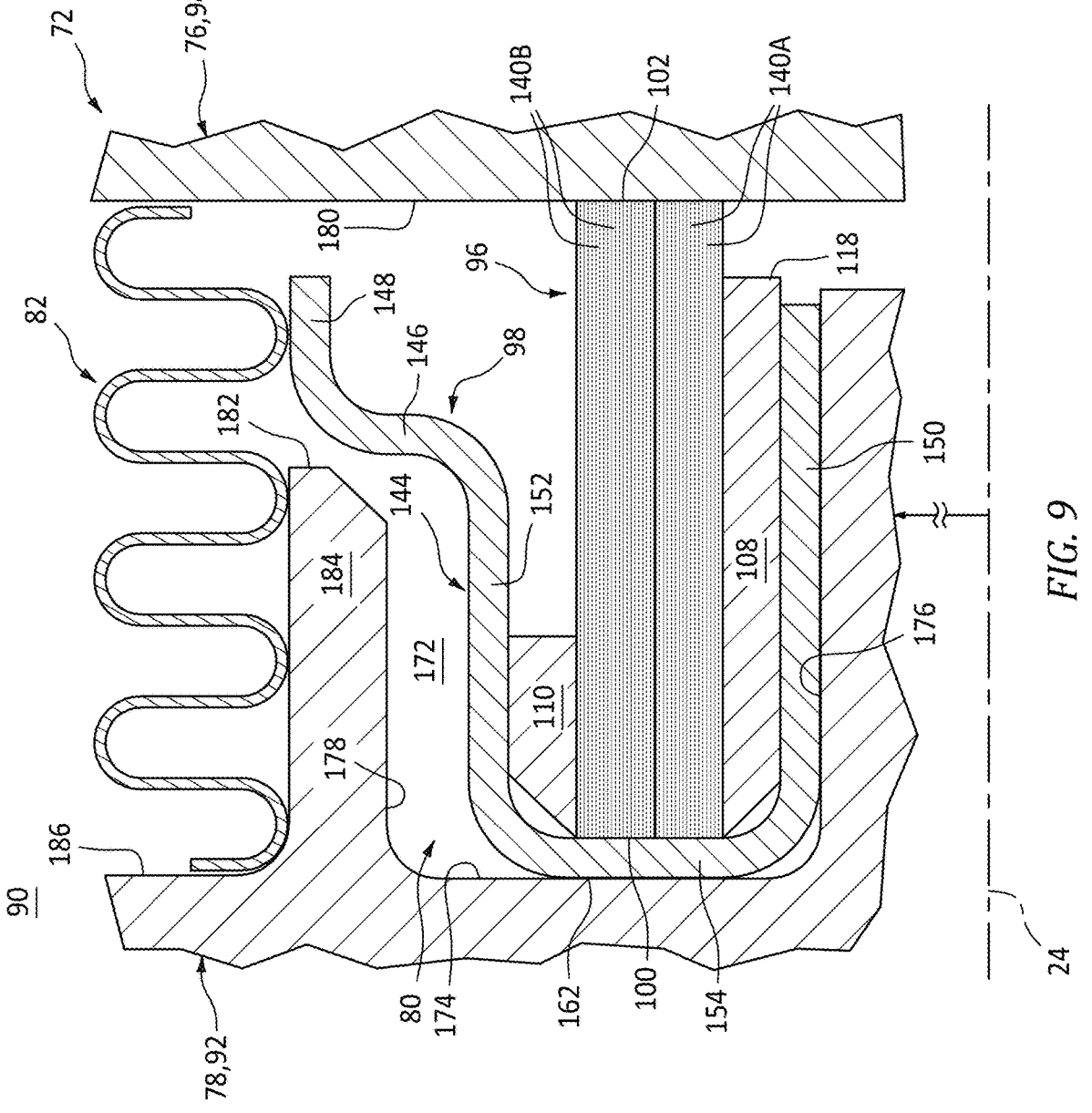
FIG. 9 is a partial sectional illustration at a seal interface between adjacent stationary engine structures.

Referring to FIG. 9, the brush seal assembly 80 is arranged axially between and retained with the blade outer air seal 78 and the vane structure 76. The brush seal assembly 80 of FIG. 9, for example, is seated within a channel 172 in the mounting structure 92 of the blade outer air seal 78. This channel 172 projects axially along the axis 24 in the second direction into the mounting structure 92 of the blade outer air seal 78 to an end 174 of the channel 172. The channel 172 extends radially within the mounting structure 92 of the blade outer air seal 78 between and to opposing radial sides 176 and 178 of the channel 172. Within the channel 172, the clip base 144 and its inner wall 150 may radially engage (e.g., contact, lay against) the channel inner side 176. The clip base 144 and its endwall 154 may axially engage (e.g., contact, lay against) the channel end 174. Here, the clip base 144 and its outer wall 152 are radially spaced from the channel outer side 178 by a radial gap; e.g., an air gap. The bristle pack 112 and its bristles 140 axially engage (e.g., contact and pressed against/are biased axially against) a radially extending seal land 180 on the mounting structure 94 of the vane structure 76. With this arrangement, the brush seal assembly 80 may provide a seal interface between the mounting structure 92 of the blade outer air seal 78 and the mounting structure 94 of the vane structure 76.

In addition to facilitating provision of the seal interface as described above, the seal clip 98 may also locate and/or support a portion of the ring seal 82 axially between the blade outer air seal 78 and the vane structure 76. The locator flange 148 of FIG. 9, for example, is disposed in an axial gap formed by and extending axially between (a) an axial distal end 182 of a flange 184 of the blade outer air seal mounting structure 92 and (b) the seal land 180. Here, the mounting structure flange 184 is radially outboard of the channel 172 and forms the channel outer side 178. With the foregoing arrangement, the locator flange 148 substantially bridges the axial gap and provides an axial extension for the mounting structure flange 184. The ring seal 82 is disposed radially outboard of the mounting structure flange 184 and the locator flange 148. The ring seal 82 may radially engage the mounting structure flange 184 and the locator flange 148 as the ring seal 82 extends axially along the axis 24 between and is biased (e.g., compressed) between a seal land 186 of the blade outer air seal mounting structure 92 and the seal land 180. With this arrangement, the ring seal 82 may provide an additional seal interface between the mounting structure 92 of the blade outer air seal 78 and the mounting structure of the vane structure 76.

Examples of the ring seal 82 include, but are not limited to, an annular W-seal element, an annular C-seal element, an S-seal element, a dog bone seal element, a rope seal element or the like. The ring seal 82 of FIG. 9 is constructed from metal or another heat resistant material. The present disclosure, however, is not limited to such exemplary ring seal configurations.

As described above, the seal clip 98 is a discretely formed element from the brush seal 96. With this arrangement, the brush seal 96 may be assembled and its members 108, 110 and 112 may be welded together without altering a geometry of the seal clip 98. Note, during a typical brush seal assembly process, one or more of the plates 108, 110 may (e.g., slightly) shift and/or thermally deform while being welded or otherwise bonded to the bristle pack 112. Such shifting and/or thermal deformation may change clearances between the respective plate(s) 108, 110 and the stationary engine structures 92, 94. However, since the brush seal 96 is mated with the seal clip 98 after assembly of the brush seal 96 (e.g., the welding of the brush seal members 108, 110 and 112 together), the assembly of the brush seal 96 does not alter a geometry of the seal clip 98. The seal clip 98 may thereby be precisely manufactured to provide specified tolerances between, for example, the locator flange 148 and the axially adjacent member(s) 94, 184.

In some embodiments, the brush seal 96 and the seal clip 98 may be circumferentially clocked about the axis 24 such that the seal gap 116 (see FIG. 4) is circumferentially misaligned from the clip gap 158 (see FIG. 8). The seal gap 116, for example, may located be diametrically opposite the clip gap 158.

Referring to FIG. 7, the offset flange 146 has a radial height 188 and the locator flange 148 has an axial length 190. In some embodiments, the radial height 188 may be sized within plus or minus fifty percent (+/−50%) or twenty-five percent (+/−25%) of the axial length 190. The radial height 188 may be equal to or less than a radial thickness 192 of the brush seal 96; see FIG. 5. The axial length 190 may be equal to or less than the radial thickness 192; see FIG. 5. The present disclosure, however, is not limited to such exemplary dimensional relationships.

While the brush seal assembly 80 is described above with respect to a turbine engine powerplant, the present disclosure is not limited to such an exemplary application. It is contemplated, for example, the brush seal assembly 80 may alternatively be configured with various other types of engines and powerplants. Moreover, it is contemplated the brush seal assembly 80 may alternatively be configured with various other types of rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a brush seal extending axially along an axis from a base end to a tip end, the brush seal extending circumferentially about the axis, the brush seal including an inner plate, an outer plate and a bristle pack disposed radially between the inner plate and the outer plate, the bristle pack bonded to the inner plate and the outer plate at the base end, and the bristle pack projecting axially along the axis away from the inner plate and the outer plate to the tip end; and
a clip including a base, an inner leg and an outer leg, the base wrapping around the brush seal at the base end, the inner leg projecting radially outward from the base to the outer leg, and the outer leg projecting axially along the axis out from the inner leg towards the tip end;
wherein the outer leg projects axially along the axis out from the inner leg to a distal end; and
wherein the distal end is axially recessed from the tip end.

2. The assembly of claim 1, wherein the clip comprises a sheet metal clip.

3. The assembly of claim 1, wherein the brush seal is seated in a channel formed in the base.

4. The assembly of claim 1, wherein
the base includes an inner wall, an outer wall and an endwall extending radially between the inner wall and the outer wall;
the inner wall extends axially along and radially engages the inner plate; and
the outer wall extends axially along and radially engages the outer plate.

5. The assembly of claim 4, wherein the endwall extends radially along and axially engages the brush seal at the base end.

6. The assembly of claim 4, wherein the inner wall projects axially along the axis out from the endwall to an axial distal end.

7. The assembly of claim 4, wherein the outer wall projects axially along the axis out from the endwall to the inner leg.

8. The assembly of claim 1, wherein a radial height of the inner leg is within fifty percent of an axial length of the outer leg.

9. The assembly of claim 1, wherein a radial height of the inner leg is equal to or less than a radial thickness of the brush seal.

10. The assembly of claim 1, wherein an axial length of the outer leg is equal to or less than a radial thickness of the brush seal.

11. The assembly of claim 1, wherein the outer leg is parallel with the bristle pack.

12. The assembly of claim 1, wherein the bristle pack comprises a plurality of first bristles and a plurality of second bristles arranged radially inboard of the plurality of first bristles; and the plurality of first bristles have a different configuration than the plurality of second bristles.

13. The assembly of claim 1, wherein at least one of the brush seal extends at least three-hundred and forty degrees circumferentially about the axis between opposing circumferential ends of the brush seal with a brush seal gap formed by and extending circumferentially between the opposing circumferential ends of the brush seal; or the clip extends at least three-hundred and forty degrees circumferentially about the axis between opposing circumferential ends of the clip with a clip gap formed by and extending circumferentially between the opposing circumferential ends of the clip.

14. The assembly of claim 13, wherein the clip gap is circumferentially offset from the brush seal gap.

15. The assembly of claim 1, further comprising a second seal disposed radially outboard of the clip and radially engaging the outer leg.

16. The assembly of claim 15, wherein the second seal comprises a ring seal.

17. The assembly of claim 1, further comprising:

a stationary first engine component; and a stationary second engine component;

the clip axially and radially engaging the stationary first engine component, and the bristle pack axially engaging the stationary second engine component at the tip end.

18. An assembly for rotational equipment, comprising:

a brush seal extending axially along an axis from a base end to a tip end, the brush seal extending circumferentially about the axis, the brush seal including an inner plate, an outer plate and a bristle pack disposed radially between the inner plate and the outer plate, the bristle pack bonded to the inner plate and the outer plate at the base end, and the bristle pack projecting axially along the axis away from the inner plate and the outer plate to the tip end; and a sheet metal clip including a channel, a radial leg and an axial leg, the brush seal seated in the channel at the base end, the radial leg projecting radially outward away from the brush seal to the axial leg, and the axial leg projecting out from the radial leg, in an axial direction towards the tip end, to a distal end that is axially recessed from the tip end.

19. An assembly for rotational equipment, comprising:

a brush seal extending axially along an axis from a base end to a tip end, the brush seal extending circumferentially about the axis, the brush seal including an inner plate, an outer plate and a bristle pack disposed radially between the inner plate and the outer plate, the bristle pack bonded to the inner plate and the outer plate at the base end, and the bristle pack projecting axially along the axis away from the inner plate and the outer plate to the tip end; and a clip comprising sheet metal configured with an inner wall, an outer wall, an endwall, an offset flange and a locator flange, the inner wall projecting axially out from an inner end of the endwall along the inner plate to a first edge of the sheet metal, the outer wall projecting axially out from an outer end of the endwall along the outer plate, the endwall axially engaging the brush seal at the base end, the offset flange projecting radially outward from the outer wall to the locator flange, and the locator flange projecting axially out from the offset flange to a second edge of the sheet metal;

wherein the brush seal extends at least three-hundred and forty degrees circumferentially about the axis between opposing circumferential ends of the brush seal with a brush seal gap formed by and extending circumferentially between the opposing circumferential ends of the brush seal;

wherein the clip extends at least three-hundred and forty degrees circumferentially about the axis between opposing circumferential ends of the clip with a clip gap formed by and extending circumferentially between the opposing circumferential ends of the clip; and wherein the clip gap is circumferentially offset from the brush seal gap.

* * * * *